United States Patent [19]

Spiess et al.

[11] 4,400,803
[45] Aug. 23, 1983

[54] WIDE SWATH PRECISION ECHO SOUNDER

[75] Inventors: Fred N. Spiess; Victor C. Anderson, both of San Diego, Calif.

[73] Assignee: The United States of America as represented by the Secretary of the Navy, Washington, D.C.

[21] Appl. No.: 267,168

[22] Filed: May 26, 1981

[51] Int. Cl.³ .................... G01S 15/89; G01S 7/54
[52] U.S. Cl. ............................... 367/88; 367/106
[58] Field of Search ..................... 367/88, 113, 106

[56] References Cited

U.S. PATENT DOCUMENTS

| | | | |
|---|---|---|---|
| 3,273,148 | 9/1966 | Wood et al. | 367/88 X |
| 3,484,737 | 12/1969 | Walsh | 367/88 |
| 3,618,007 | 11/1971 | Anderson | 367/113 |
| 4,088,978 | 5/1978 | Gilmour | 367/88 |
| 4,207,620 | 6/1980 | Morgera | 367/88 |

Primary Examiner—Richard A. Farley
Attorney, Agent, or Firm—Robert F. Beers; Thomas M. Phillips

[57] ABSTRACT

A Wide Swath Precision Echo Sounder is provided by means of transmitting programmed acoustic pulses (pings) to insonify a target area and receiving the backscattered energy in two receivers separated vertically. The outputs of each receiver are stored (including phase information) and synthetic aperature outputs are generated. Each space resolution cell will have a phase associated with it for each receiver. Using the interferometer technique, the phase is converted into a depression angle and is combined with the slant range to the particular space cell to provide a numerical measure of the depth and lateral range to the particular spot under consideration.

6 Claims, 6 Drawing Figures

WIDE SWATH PRECISION ECHO SOUNDER

BACKGROUND OF THE INVENTION

The present invention relates to high resolution sonar for providing topographic chart data and more particularly to high resolution sonar which provides depth information along with high spatial resolution.

Synthetic aperture techniques have long been used in radar to generate "pictures" of terrain, essentially mapping the variations in the backscattering properties of the area under observation. Such pictures, as with ordinary sidelooking sonar or radar, provide no quantitative representation of the topography of the surface being viewed. A discussion of synthetic aperture imagine systems may be had by reference to U.S. Pat. No. 4,088,978, entitled "Synthetic Aperture Side-Looking Sonar System".

SUMMARY OF THE INVENTION

The present invention includes a pair of vertically separated receivers for receiving backscattered energy reflected from a target area insonified by programmed acoustic pulses (pings) from a single transmitter. The output signals from each receiver are stored (including phase information) and synthetic aperture outputs generated. Each space resolution cell will have a phase associated with it for each receiver. Combining the difference in phase between the two receivers with the slant range to the particular space cell, will provide a numerical measure of the depth and lateral range to the particular spot under consideration. The resulting set of numbers for all space cells will constitute a set of high resolution data for topographic charting.

Therefore, an object of the invention is to provide an improved sonar apparatus for generating topographic chart data.

Another object of the invention is to provide an improved sonar apparatus for generating topographic chart data by combining synthetic aperture and interferometer processing.

A further object of the invention is to use a sequence of frequencies which will increase the rate at which an area under consideration can be searched.

Other objects, advantages and novel features of the invention will become apparent from the following detailed description of the invention when considered in conjunction with the accompanying drawings wherein.

Figure 1:
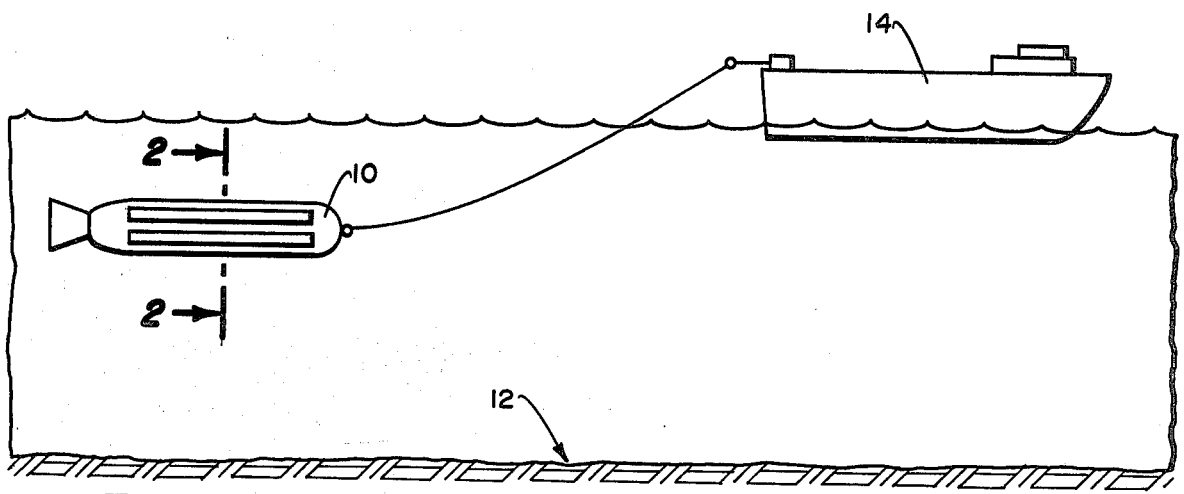
FIG. 1 shows a towbody for transporting the apparatus embodying the invention.
Figure 2:
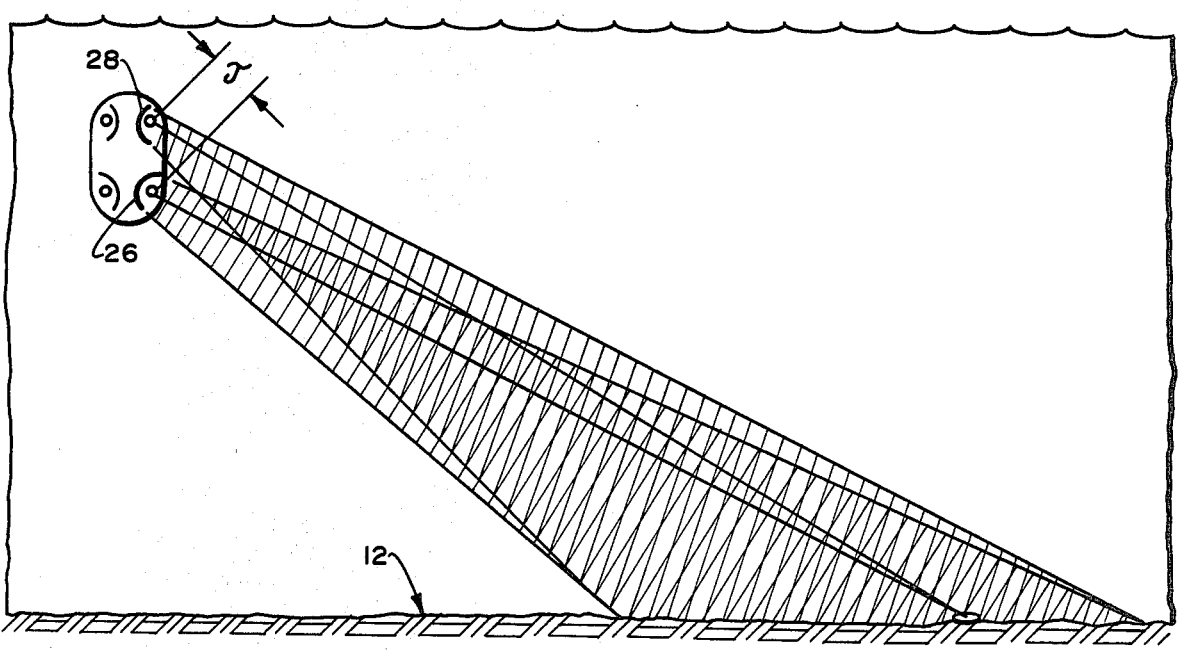
FIG. 2 is a cross section of the towbody of FIG. 1 taken along the lines 2—2 and showing the geometry of the sonar beams.

In FIG. 1 a sonar system embodying the invention is transported by an underwater vehicle 10 which is towed along a course line over a target area 12 by means of a tow vehicle such as a ship 14. As shown in FIG. 2, there will be a time delay, T, between the arrival time of reflected energy from the same point received at receiver 26 and receiver 28.

Figure 3:
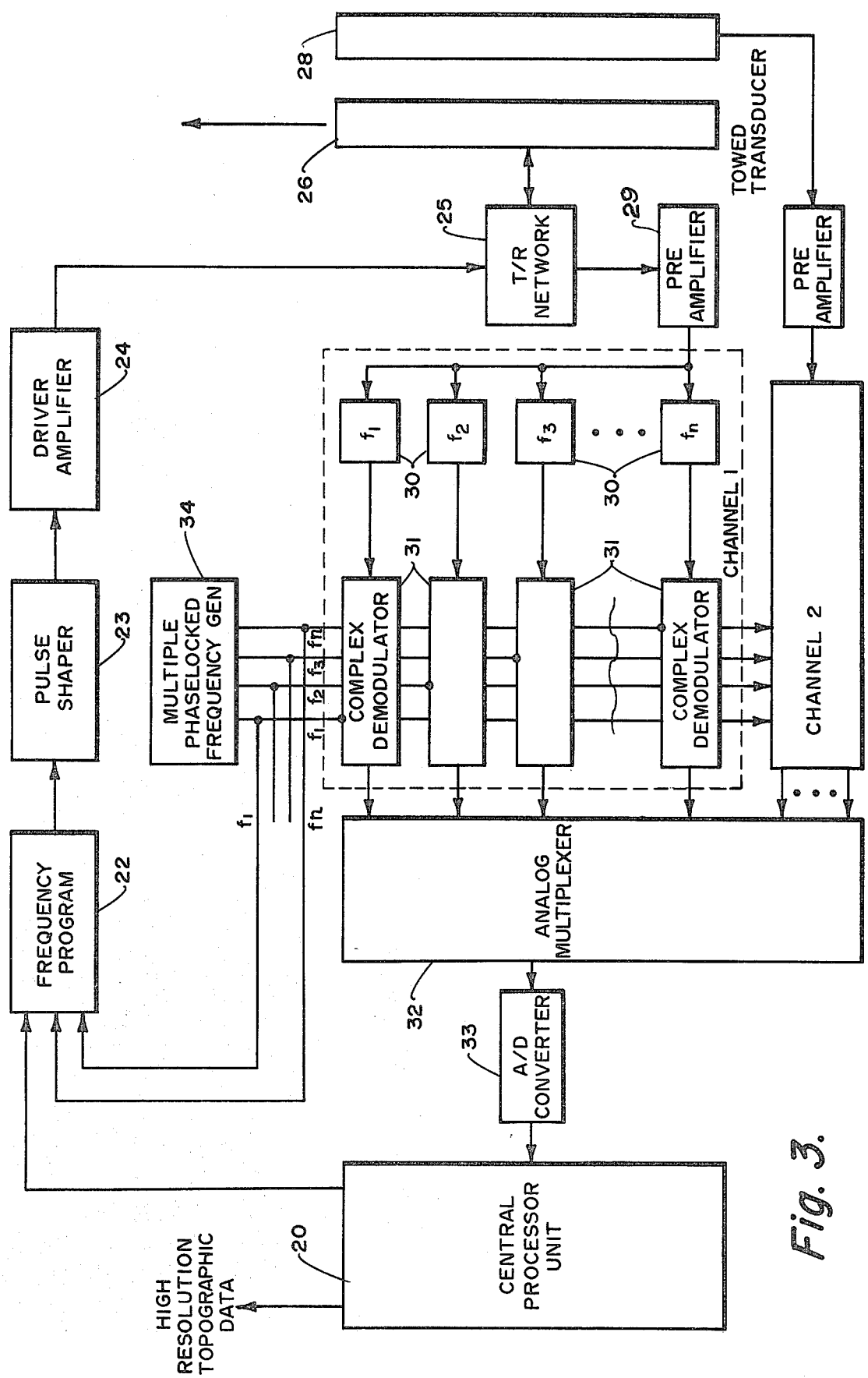
FIG. 3 is a block diagram of a sonar system embodying the invention.
Figure 4:
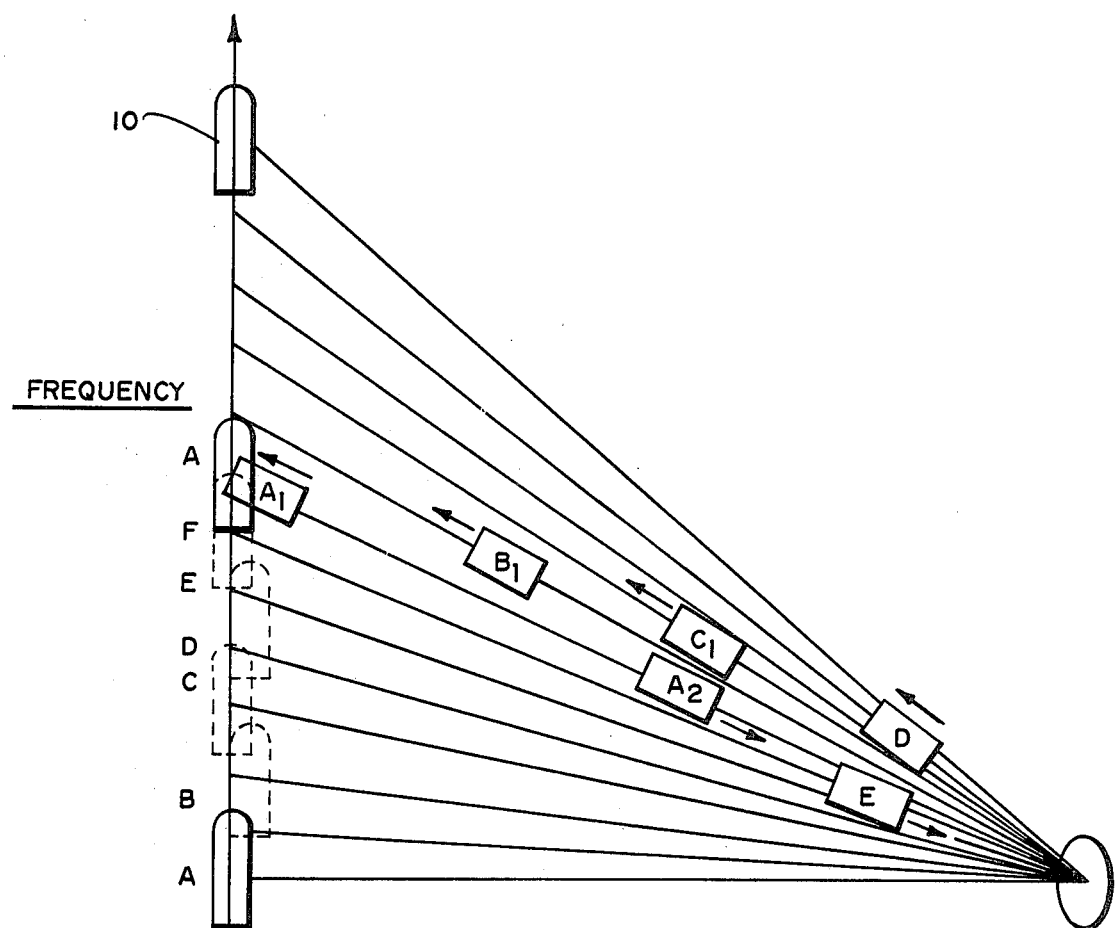
FIG. 4 is a diagram showing the use of multiple transmission frequencies under the condition of nonoverlapping of transducer positions.

The programmed acoustic pulses to be transmitted are generated as shown in FIG. 3. One of the functions of the central processing unit 20 is to provide a control signal to the frequency program 22 which provides an output pulse at a chosen frequency to pulse shaper 23. The output of pulse shaper 23 is amplified in driver amplifier 24 to the desired amplitude and fed through T/R network 25 to transducer 26. As shown in FIG. 2, the transmitted signals are reflected back and received at both transducers 26 and 28. Sequencing of the pulses at the different frequencies is such that the extended reflected signals from the bottom will overlap each other in time. The output signals from transducer 26 will be processed through a first channel while the output signals from transducer 28 will be processed through a second channel. Each channel is identical and only the first channel will be described.

The backscatter signal received at transducer 26 will be fed through T/R network 25 and amplified in pre-amplifier 29. The output from pre-amplifier 29 is fed to a bank of filters 30 (f1–fn) where, the multiple frequency signals will be separated, each passing through its respective filter and processed by its corresponding complex demodulater 31. The demodulated signals are fed to analog multiplexer 32 and provides an analog signal input to analog to digital converter 33. The digital output signals from each channel are stored and processed to form a synthetic aperture output.

Multiple phaselocked frequency generator 33 provides the reference frequencies for the complex demodulators 31 as well as the carrier frequencies for the transmitted pulses as shaped by pulse shaper 33.

In operation, the control signal from CPU 20, a trigger pulse, is fed to frequency programmer 22 and by way of example, selects frequency, f1, of the frequency program. Frequency program 22 is simply a logic circuit for sequentially selecting the carrier frequency of the pulse to be transmitted from multiple phaselocked frequency generator 34. Frequency generator 34 may be a bank of conventional divide by N resettable counters driven by a crystal controlled oscillator.

Figure 5:
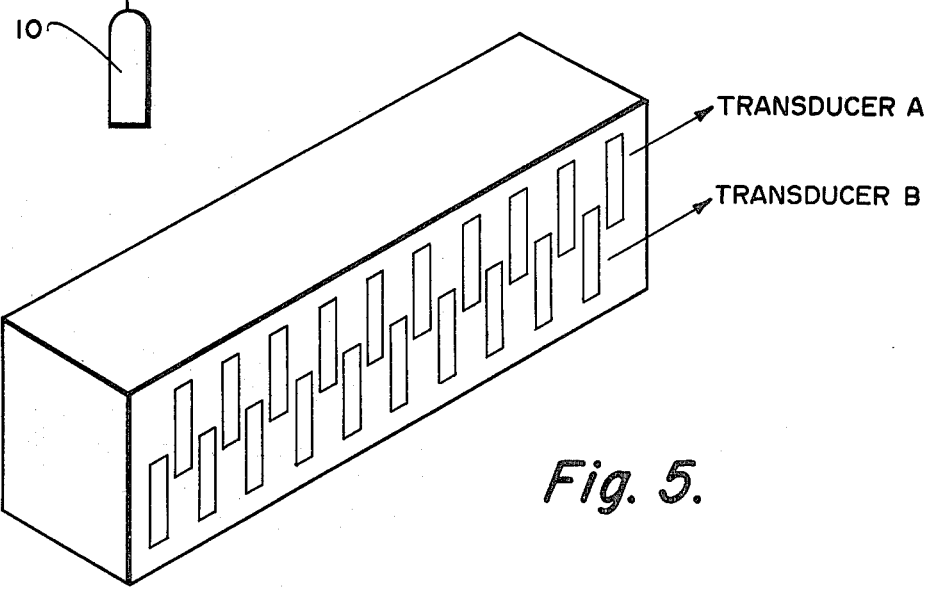

During the interval when the backscattered energy is arriving for frequency f1, other frequencies will have been transmitted and backscattered energy at different ranges will be received at the receiver transducer as illustrated in FIG. 5. Filter 30 having a band pass of f1 passes the backscattered energy associated with transmitted frequency f1. This signal is demodulated to base band for bandwidth compression in the conventional manner.

Complex demodulator 31 may be composed of conventional four quadrant multipliers. All of the outputs from complex demodulator 31 are sequentially time multiplexed into the analog-to-digital converter 33.

The digital outputs of converter 33 are stored in memory in CPU 20. CPU 20 performs the transformation on the data set according to the following sequence. As the complex digital output samples from analog-to-digital converter 33 are received by CPU 20, each sample is multiplied by a rotating vector to unwind the phase shift corresponding to its particular frequency. During the time interval between sequences, each of the phase corrected stored echo sequences is further corrected for the water path travel time delay associated with its respective element position in the synthetic aperture. This is done by both further phase shifting and selecting a sample from a different time in the stored sequence. The selection is made depending on the geometrical relationship of the range call and the element of the synthetic aperture. All of the time delayed signals are added to generate the synthetic aperture beam. This correction process is carried out for each range cell. This then provides a numerical measure of the depths and lateral ranges to the particular points of target area from which the backscattered energy was reflected. The resultant output constitutes the high resolution data set.

Figure 6:
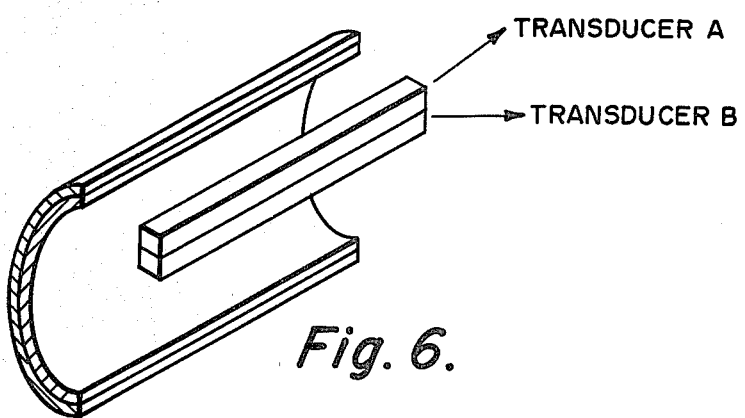
FIGS. 5 and 6 show alternate transducer configurations.

The transducer configuration shown in FIGS. 1 and 2 are shown vertically separated. Other configurations can be utilized, as for example, the configuration of FIGS. 5 and 6. FIG. 5 shows a staggered array with transducer A being vertically separated from transducer B. In FIG. 6 a single parabolic reflector is shown for both transducers A and B.

Obviously many modifications and variations of the present invention are possible in the light of the above teachings. It is therefore to be understood that within the scope of the appended claims the invention may be practiced otherwise than as specifically described.

We claim:

1. A wide swath precision echo sounder for providing topographic profiles of a target area with high spatial resolution comprising:

moving transmitter means for transmitting a plurality of programmed acoustic pulses substantially perpendicular to the direction of motion of said transmitting means, said moving transmitter means including multiple frequency generating means, frequency programming means and control circuit means, said frequency programming means being coupled to said multiple frequency generating means and to said control circuit means for sequencing said acoustic pulses, where each pulse of said plurality of programmed acoustic pulses is transmitted at a different frequency and to cause the extended reflected signals from the target area to overlap each other in time, dual receiving means for receiving the backscattered energy from said target area, and synthetic aperture and interferometer circuit means coupled to said dual receiving means for processing sequences of said received energy from said target area to provide a numerical measure of the depths and lateral ranges to the particular points of target area from which said backscattered energy was reflected.

2. The echo sounder of claim 1 wherein said processing circuit includes a bank of band pass filters for separating the received backscattered energy according to its transmitted frequency.

3. The echo sounder of claim 2 wherein said signal processing circuit includes a processing channel for each receiving means, the output of each channel representing a space resolution cell with a phase associated with it for each receiving means and circuit means for combining the difference in phase between the dual receiving means with the slant range to the particular space cell.

4. A wide swath precision echo sounder for providing topographic profiles of a target area with high spatial resolution comprising:

moving transmitter means for transmitting a plurality of programmed acoustic pulses substantially perpendicular to the direction of motion of said transmitting means, said moving transmitter means including multiple frequency generating means, frequency programming means and control circuit means, said frequency programming means being coupled to said multiple frequency generating means and to said control circuit means for sequencing said acoustic pulses, where each pulse of said plurality of programmed acoustic pulses is transmitted at a different frequency and to cause the extended reflected signals from the target area to overlap each other in time, said moving transmitter means including two vertically separated synthetic aperture receivers for receiving backscattered energy from said target area, and synthetic aperture and interferometer circuit means coupled to said synthetic aperture receivers for processing sequences of said received energy from said target area to provide a numerical measure of the depths and lateral ranges to the particular points of target area from which said backscattered energy was reflected.

5. The echo sounder of claim 4 wherein said processing circuit includes a bank of bad pass filters for separating the received backscattered energy according to its transmitted frequency.

6. The echo sounder of claim 5 wherein said signal processing circuit includes a processing channel associated for each receiver, the output of each channel representing a space resolution cell with a phase associated with it for each receiving means and circuit means for combining the difference in phase between the dual receiving means with the slant range to the particular space cell.

* * * * *